(12) United States Patent
Xiao

(10) Patent No.: US 12,442,475 B2
(45) Date of Patent: Oct. 14, 2025

(54) PUSH TYPE CONDUIT JOINT RELEASE STRUCTURE

(71) Applicant: XIAMEN TONGJIE TECHNOLOGY., LTD, Xiamen (CN)

(72) Inventor: Lihua Xiao, Xiamen (CN)

(73) Assignee: XIAMEN TONGJIE TECHNOLOGY., LTD, Xiamen (CN)

( * ) Notice: Subject to any disclaimer, the term of this patent is extended or adjusted under 35 U.S.C. 154(b) by 0 days.

(21) Appl. No.: 19/078,347

(22) Filed: Mar. 13, 2025

(65) Prior Publication Data

US 2025/0207700 A1    Jun. 26, 2025

(51) Int. Cl.
*F16L 37/088* (2006.01)
*F16L 37/091* (2006.01)

(52) U.S. Cl.
CPC ....... *F16L 37/0887* (2019.08); *F16L 37/0915* (2016.05)

(58) Field of Classification Search
CPC . F16L 37/091; F16L 37/0915; F16L 37/0925; F16L 37/1225; F16L 37/0887
See application file for complete search history.

(56) References Cited

U.S. PATENT DOCUMENTS

| | | | | |
|---|---|---|---|---|
| 5,603,530 A * | 2/1997 | Guest | ............... | F16L 37/091 285/110 |
| 5,911,443 A * | 6/1999 | Le Quere | ............ | F16L 37/0915 285/379 |
| 6,499,771 B1 * | 12/2002 | Snyder, Sr. | ......... | F16L 37/0925 285/319 |
| 6,824,172 B1 * | 11/2004 | Komolrochanaporn | ..................... | F16L 37/0925 285/105 |
| 2003/0067163 A1 * | 4/2003 | Ebinger | ............... | F16L 37/1225 285/305 |
| 2008/0012311 A1 | 1/2008 | Yamazaki et al. | | |
| 2011/0101685 A1 * | 5/2011 | Lai | ...................... | F16L 37/0915 29/244 |
| 2011/0309611 A1 * | 12/2011 | Smith | .................... | F16L 37/091 285/139.3 |
| 2012/0074695 A1 * | 3/2012 | Salehi-Bakhtiari | ......................... | F16L 37/0915 285/377 |
| 2012/0098250 A1 | 4/2012 | Chang et al. | | |

(Continued)

FOREIGN PATENT DOCUMENTS

| | | | | |
|---|---|---|---|---|
| DE | 102014225279 A1 * | 6/2016 | .......... | F16L 37/0915 |
| EP | 2282102 A2 * | 2/2011 | .......... | F16L 37/0915 |

(Continued)

*Primary Examiner* — Zachary T Dragicevich
*Assistant Examiner* — Fannie Kee
(74) *Attorney, Agent, or Firm* — Hemisphere Law, PLLC; Zhigang Ma

(57) ABSTRACT

A push type conduit joint release structure is provided, and relates to the field of conduits. The push type conduit joint release structure includes a tubular main body. The main body is internally provided with a gear ring and a propeller. The gear ring includes an outer ring with a first notch, and a plurality of teeth slantly protrude towards an axial direction of the outer ring on an inner wall of the outer ring. An inner circumferential wall of the main body is concave at the position of the gear ring to form a limit ring groove. When the gear ring is located inside the limit ring groove, the teeth protrude out of an inner circumferential wall of the propeller.

10 Claims, 7 Drawing Sheets

(56) References Cited

U.S. PATENT DOCUMENTS

| | | | | |
|---|---|---|---|---|
| 2012/0126526 A1* | 5/2012 | LeQuere | ............. | F16L 37/0915 |
| | | | | 285/104 |
| 2014/0021717 A1* | 1/2014 | Burke | ................... | F16L 37/091 |
| | | | | 285/321 |
| 2015/0137515 A1* | 5/2015 | Ratschmann | ......... | F16L 37/091 |
| | | | | 285/340 |
| 2015/0159792 A1* | 6/2015 | Bobo | ................... | F16L 37/091 |
| | | | | 285/308 |
| 2015/0240980 A1* | 8/2015 | Bobo | ................... | F16L 37/091 |
| | | | | 285/321 |
| 2016/0273695 A1* | 9/2016 | Bobo | ............. | F16L 37/0915 |
| 2017/0051853 A1 | 2/2017 | Wu | | |
| 2023/0243449 A1* | 8/2023 | Ginczek | ............. | F16L 37/0887 |
| | | | | 285/82 |

FOREIGN PATENT DOCUMENTS

| | | | | |
|---|---|---|---|---|
| KR | 20090057899 A | * | 6/2009 | .......... F16L 37/0915 |
| KR | 20150120328 A | * | 10/2015 | .......... F16L 37/0915 |
| WO | WO-2024107433 A1 | * | 5/2024 | .......... F16L 37/0915 |

* cited by examiner

PUSH TYPE CONDUIT JOINT RELEASE STRUCTURE

TECHNICAL FIELD

The present disclosure belongs to the field of conduits, and more specifically relates to a push type conduit joint release structure.

BACKGROUND

In the construction cornerstone of modern society, the conduit system is of great importance as a fluid transport core facility. No matter for daily water supply needed by households or complex fluid networks in schools, medical institutions and commercial buildings, the conduit system bears the tasks of effective circulation and efficient utilization of various fluids such as hot and cold water, air, ethylene glycol, compressed air, inert gases, various chemicals, wastewater treatment, cooling media and coatings.

The construction of the conduit systems is inseparable from diversified choices of materials. The materials are of own characteristics to adapt to different fluid characteristics, pressure requirements and cost control needs. The copper pipe has an established place in the hot water supply system because of excellent thermal conductivity and corrosion resistance.

The conduit connection technology is a key link in building a complex pipeline network, and the flexibility and reliability of the conduit connection technology are very important. In order to achieve smooth connection of conduits in different layouts and directions, various fittings and valves have been emerged. Conduit fittings such as elbows and three-way pipes can flexibly adjust the conduit direction to meet diverse layout needs. The connector ensures tight connection between the conduits and prevents fluid leakage. Control valves such as ball valves and globe valves are responsible for regulating flow to ensure the safe and efficient operation of the system. These fittings and valves are combined for use, so that the assembly efficiency and operational reliability of the conduit system are greatly improved.

The conduit connection technology has undergone a transformation from traditional welding and brazing to modern quick connection technology since ancient times. Although traditional welding and brazing methods can achieve firm connection between conduits, the operational process is tedious and has many challenges. Before brazing, it is necessary to strictly clean the conduit ends, smear flux, and equip professional skills and protective equipment. The whole process is time-consuming and laborious, and there are certain safety risks. In addition, either welding or brazing can only realize the installation of conduits, but cannot realize the removal of conduits.

In recent years, the push-fit connection technology has gradually emerged in the field of conduit connection because of the advantages of convenience, high speed and low material requirement. This technology does not need complex welding operation, and only requires simple tools such as conduits, quick-connect fittings, deburring tools and cutters to complete installation and disassembly.

As shown in a push type connection fitting release auxiliary assembly disclosed in the invention patent with the patent announcement number of CN106461131B, the core lies in the design of a gear ring (a chuck and a clamping ring) and a release propeller. When the conduit is inserted into the connection fitting, the conduit can be automatically clamped by the gear ring to form reliable seal and connection. When the release propeller is squeezed, the release propeller will extrude the gear ring so that the conduit is loosened by the gear ring to realize that the conduit is removed from the conduit joint.

This connection method not only simplifies the operational process and reduces the installation cost, but also improves the work efficiency.

However, the early push-fit connection technology still has the problems of too many fittings and insufficient clamping (the gear ring is of a single-layer structure). Specifically, for example, the gear ring in the conduit joint can be supported by additional seal ring support components and pipeline support components on both sides. The problems of too many parts in the conduit joint, poor stability and insufficient clamping are caused. Therefore, a novel scheme is needed to solve the above-mentioned problems.

SUMMARY

Aiming at the shortages in the prior art, the present disclosure aims to provide a push type conduit joint release structure. The push type conduit joint release structure has the advantages of reducing the quantity of fittings and promoting the structural stability.

In order to achieve above-mentioned purpose, the present disclosure provides the following technical scheme.

A push type conduit joint release structure includes a tubular main body. The main body is internally provided with a gear ring and a propeller.

The gear ring includes an outer ring with a first notch. A plurality of teeth slantly protrude towards an axial direction of the outer ring on an inner wall of the outer ring.

An inner circumferential wall of the main body is concave at the position of the gear ring to form a limit ring groove. When the gear ring is located inside the limit ring groove, the teeth protrude out of an inner circumferential wall of the propeller.

The present disclosure is further provided that a multi-layered structure of the teeth is formed along an axial direction of the outer ring, and avoidance holes for the teeth to pass through are formed in a circumferential side wall of the propeller.

The present disclosure is further provided that the outer ring and all teeth are connected through connecting parts, respectively.

The present disclosure is further provided that the outer ring, the connecting parts and the teeth are integrally formed.

The present disclosure is further provided that the joint of the connecting part and the tooth is in arc transition or angle transition.

The present disclosure is further provided that the structure also includes a sleeve and a releaser.

The sleeve includes an upper sleeve, a lower sleeve and a connector for connecting the upper sleeve and the lower sleeve, and a region between the upper sleeve and the lower sleeve is partitioned by the connector to form at least one second notch.

The releaser includes an open release part and a handle part located behind the release part.

The present disclosure is further provided that two groups of connectors are provided, and the two groups of connectors are symmetrically provided. A region between the upper sleeve and the lower sleeve are partitioned by the connectors to form two symmetrical second notches.

The present disclosure is further provided that the release part includes two legs and a waist for connecting the two legs. One end, away from the waist, of each of the two legs is provided with a guide part. The thickness of the guide part is gradually increased from one end away from the waist to the other end.

The present disclosure is further provided that the two legs and the waist are integrally formed.

The present disclosure is further provided that the upper sleeve, the lower sleeve and the connectors are integrally formed.

In conclusion, the present disclosure at least has the following advantages.

Firstly, the gear ring is provided with the first notch, and the corresponding limit ring groove is formed in the main body for clamping the gear ring. Therefore, when the gear ring is fed into the conduit joint, the gear ring can be extruded to realize the reduction of the diameter so as to realize the installation of the gear ring. After the gear ring enters into the limit ring groove, the original size of the gear ring is recovered so that the gear ring can be clamped in the limit ring groove, thereby replacing the scheme of supporting the gear ring by additional seal ring support components and conduit support components on both sides in the prior art, reducing the quantity of fittings, increasing the clamping force for the conduit and promoting the structural stability.

Secondly, in the scheme, the circumferential side wall of the gear ring is expressed as a large-breadth surface by limiting the teeth as a multilayered structure, and the abutting area of the gear ring and the limit ring groove since the gear ring is nonlinear, so that the structural stability of the gear ring is ensured.

Thirdly, the size of the existing releaser is reduced by setting the sleeve and the releaser, so that the structure can adapt to the release of more conduit joints leaning against the wall and being blocked by objects.

REFERENCE SIGNS 1, conduit joint; 11, main body; 110, inner wall; 1101, outer wall; 111, step; 112, limit ring groove; 113, first avoidance channel; 12, seal component; 14, gear ring; 141, outer ring; 1410, inner wall; 1411, first notch; 142, connecting part; 143, tooth; 16, propeller; 160, circumferential side wall; 1601, inner circumferential wall; 161, protruding portion; 162, avoidance hole; 2, sleeve; 21, upper sleeve; 22, lower sleeve; 23, connector; 24, second notch; 3, releaser; 31, release part; 311, leg; 3111, guide part; 312, waist; 32, handle part; 4, conduit; and 5, axial direction.

DETAILED DESCRIPTION OF THE EMBODIMENTS

The following describes the present disclosure in detail with reference to the attached figures.

Figure 1:
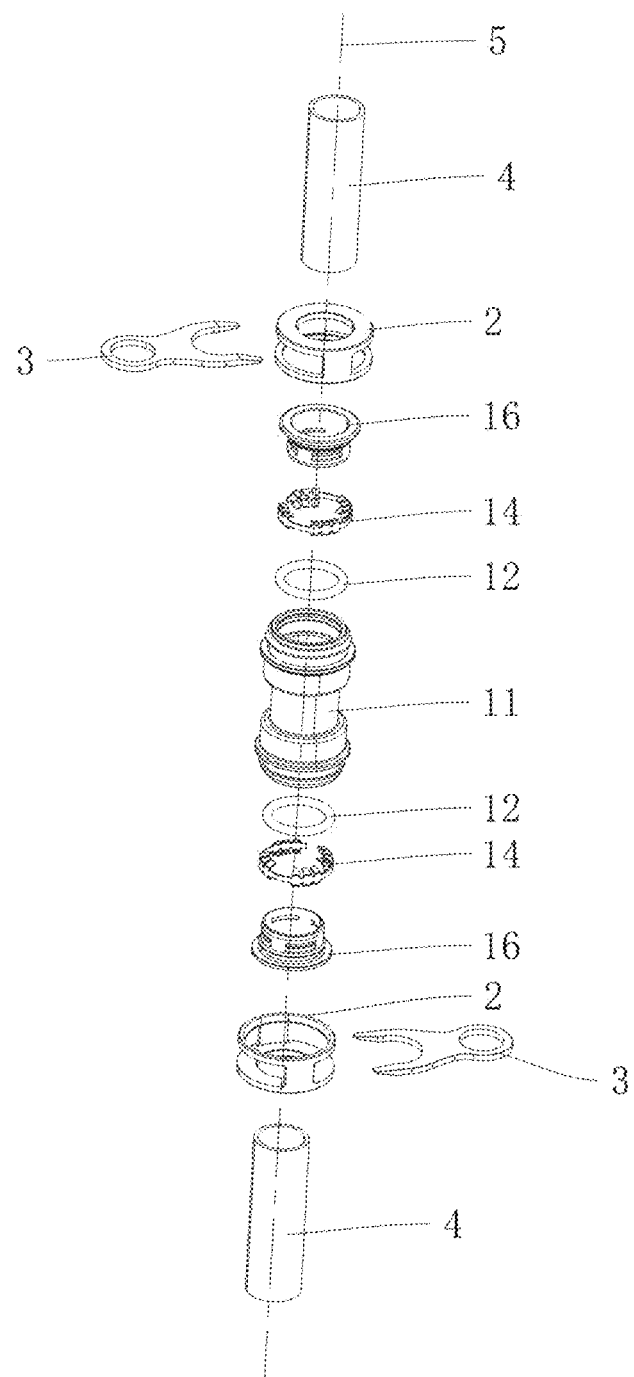
FIG. 1 is an exploded view of one preferred embodiment in the present disclosure.
Figure 2:
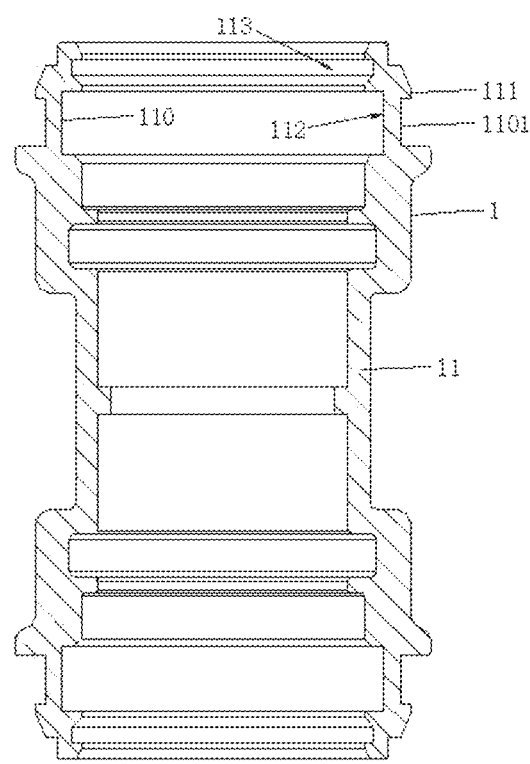
FIG. 2 is a cross-section diagram of a conduit joint in the present disclosure.

A push type conduit joint release structure is disclosed, as shown in FIG. 1 and FIG. 2. Wherein, a conduit joint 1 includes a tubular main body 11. The main body 11 may be a straight pipe, a three-way pipe or a multi-way pipe. In an embodiment that the main body 11 is a multi-way pipe, a sleeve 2 in the present disclosure may be pre-assembled at each pipe opening (a pre-assembly effect may be realized in an after-loading manner through equipment pre-assembly in a production process of the conduit joint), but all pipe openings may be adapted by means of only one releaser 3.

Figure 3:
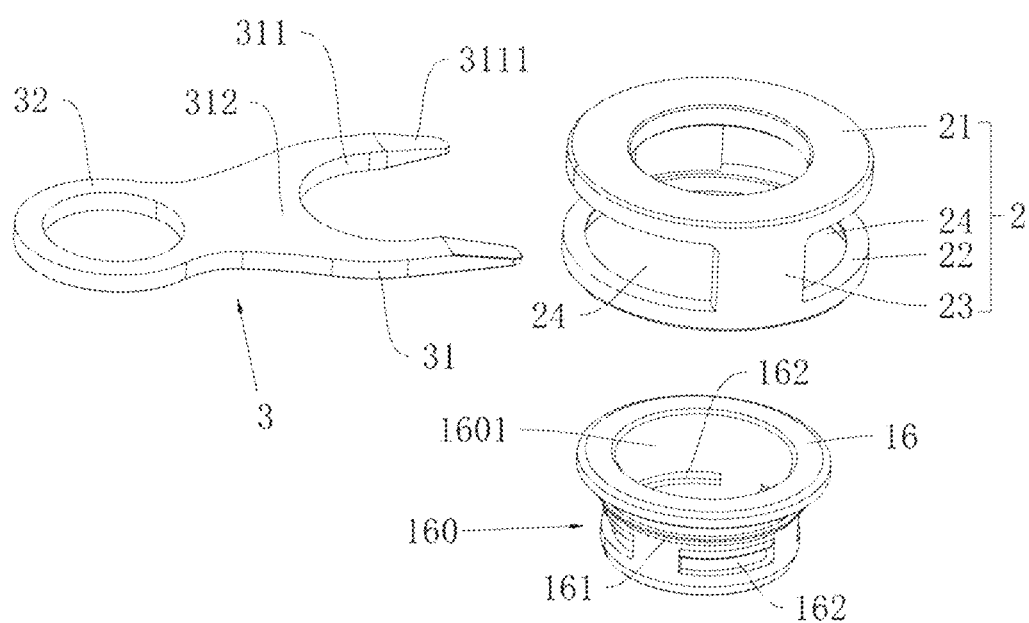
FIG. 3 is an exploded view of a propeller, a sleeve and a releaser in a preferred embodiment of the present disclosure.
Figure 4:
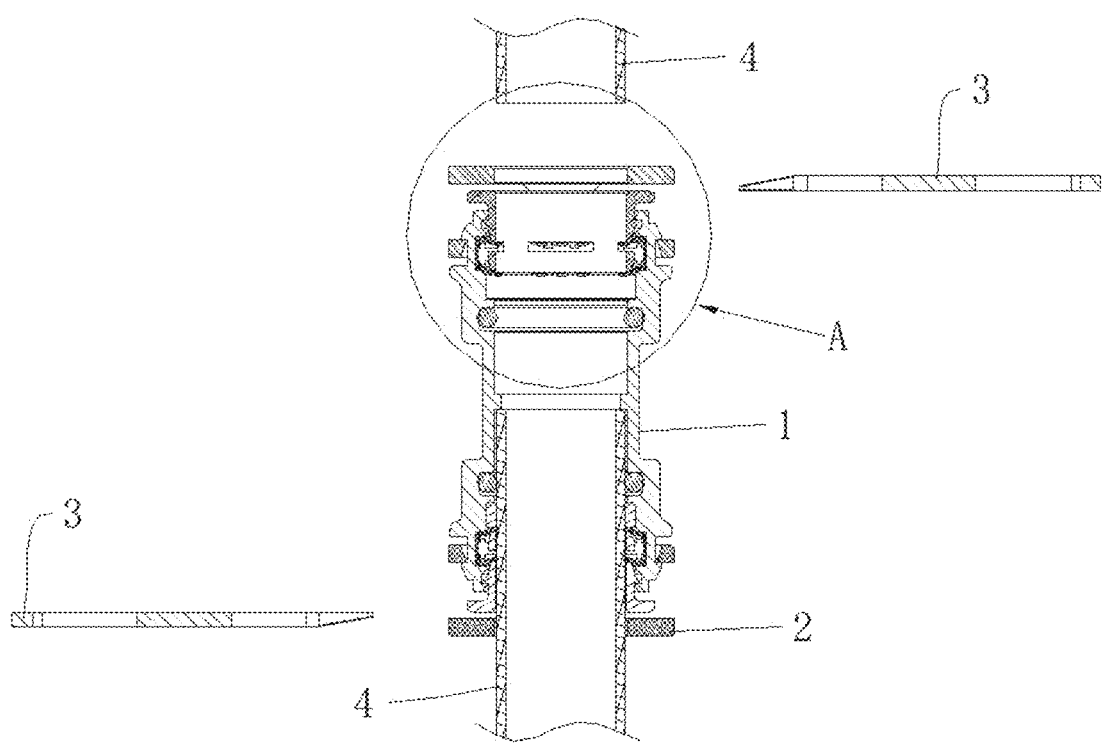
FIG. 4 is a cross-section diagram of one preferred embodiment in the present disclosure.
Figure 5:
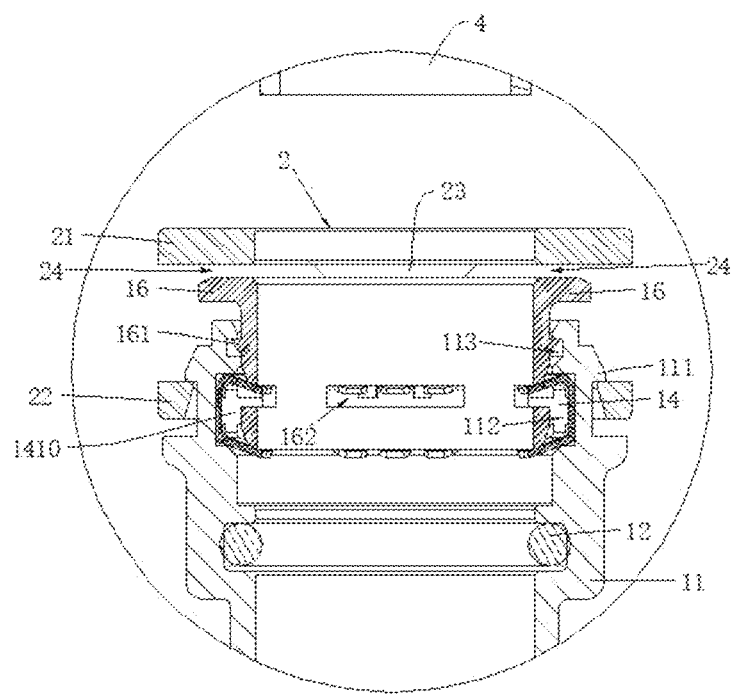
FIG. 5 is an enlarged drawing of part A in FIG. 4.

As shown in FIG. 1 and FIG. 3, the interior of the main body 11 at any end is provided with a gear ring 14 and a propeller 16 in sequence from inside to outside. The gear ring 14 and the propeller 16 are annularly arranged at the position of an inner wall 110 of the main body 11. Wherein, as shown in FIG. 2, FIG. 4 and FIG. 5, an inner circumferential wall of the main body 11 is concave at the position of the gear ring 14 to form a limit ring groove 112. When the gear ring 14 is located inside the limit ring groove 112, teeth 143 protrude out of an inner circumferential wall 1601 of the propeller 16. At the same time, an inner circumferential wall of the main body 11 is concave to form a first avoidance channel 113 for a protruding portion 161 of the propeller 16 to move, so that the propeller 16 may move at a certain distance along an axial direction of the main body 11 to further extrude the gear ring 14.

Figure 6:
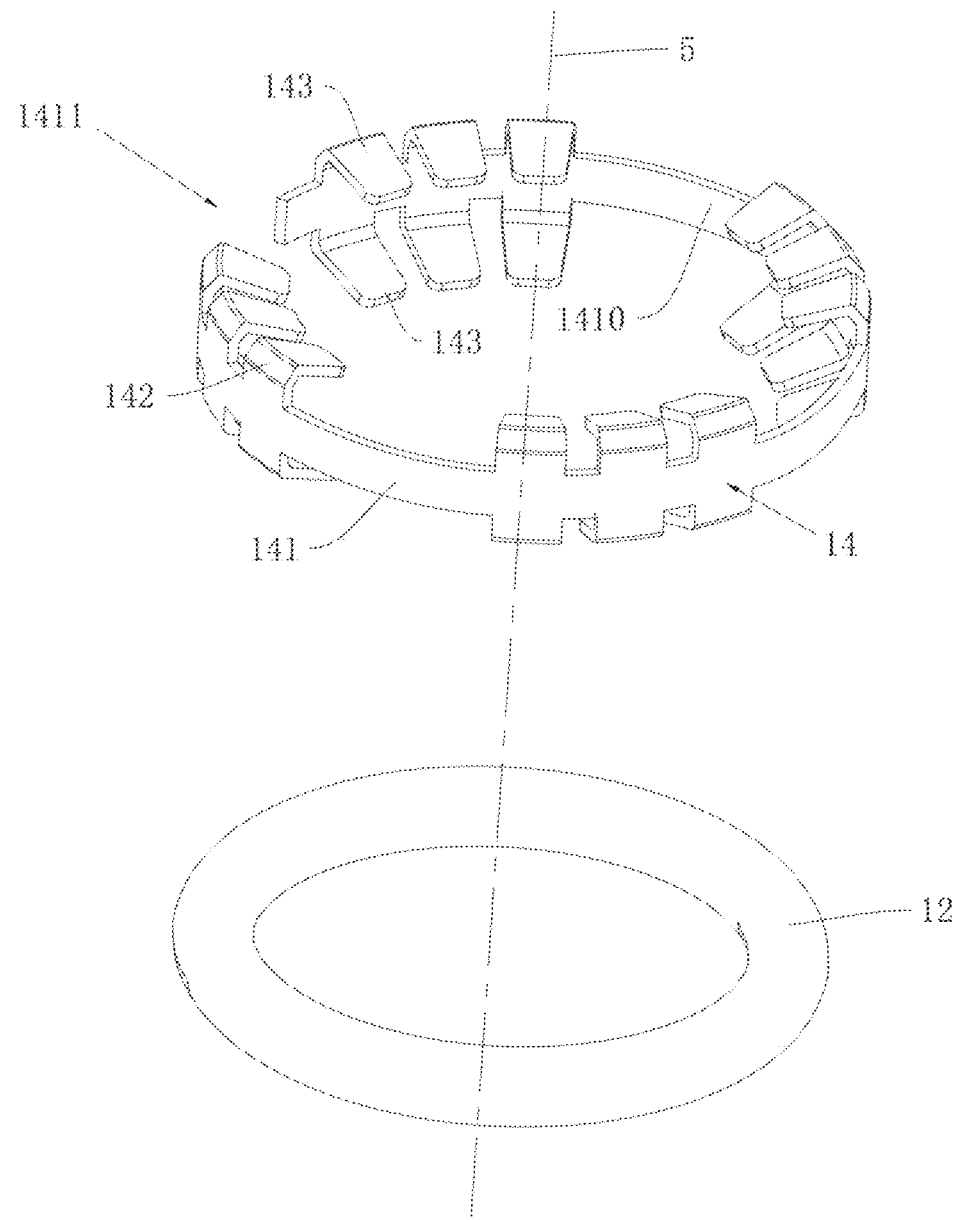
FIG. 6 is an exploded view of a gear ring and a seal component in a preferred embodiment of the present disclosure.

As shown in FIG. 5 and FIG. 6, the gear ring 14 includes an outer ring 141 with a first notch 1411. The outer diameter of the outer ring 141 is equal to or slightly larger than the groove bottom diameter of the limit ring groove 112, so that the first notch 1411 is extruded when the outer ring 141 is inside the limit ring groove 112. The outer ring 141 has an external expansion force, so that the outer ring 141 is locked in the limit ring groove 112. At the same time, after the first notch 1411 is shrunk by stress, the diameter of the first notch 1411 may be smaller than the inner diameter of an opening position of the main body 11, so that the gear ring may normally enter into the main body 11 for installation. Because of the first notch 1411, the pipe inner diameter of the main body 11 may change within a certain extent. The gear ring 14 in the scheme may adapt the pipe inner diameters of different main bodies 11.

As shown in FIG. 5 and FIG. 6, a plurality of teeth 143 protrude towards an axial direction 5 of the outer ring 141 on an inner wall 1410 of the outer ring 141. The teeth 143 of the gear ring 14 are slant towards a direction away from the propeller 16, and the inner diameter (referring to the measurement to teeth instead of the ring) of the gear ring 14 is slightly smaller than the inner diameter of the propeller 16, so that after a conduit 4 is inserted into the propeller 16, the gear ring 14 can be pushed away and limit the conduit 4 from being pulled out after being inserted. In order to ensure the clamping effect and installation stability of the gear ring, in some embodiments, a multilayered structure of the teeth 143 is formed along an axial direction of the outer ring 141. Through the design of the multilayered structure of the teeth 143, on one hand, the conduit 4 can be further clamped, on the other hand, the area of the circumferential side wall of the outer ring 141 can be enlarged, so that the abutting area of the outer ring 141 and the limit ring groove 112 is enlarged, and the installation stability of the gear ring 14 is improved. In order to ensure that all the teeth 143 can be pushed away by the propeller 16, avoidance holes 162 for the teeth 143 to pass through are formed in a circumferential side wall of the propeller 16 (as shown in FIG. 3 and FIG. 5). Partial or all teeth 143 can protrude out of the inner side of the inner circumferential wall of the propeller 16 through the avoidance holes 162, and are quickly pushed away by the propeller 16.

As shown in FIG. 5 and FIG. 6, in order to ensure the deformability of the teeth 143, in some embodiments, the outer ring 141 and all the teeth 143 are connected through connecting parts 142, respectively. The joint of the connecting part 142 and the tooth 143 is in arc transition or angle transition because of chamfering. The outer ring 141, the connecting parts 142 and the teeth 143 are integrally formed. A spacing is formed between every two adjacent connecting parts 142. Therefore, after the teeth 143 are extruded, the connecting part 142 is deformed more easily relative to the whole body of the outer ring 141, so that the deformability of the teeth 143 is ensured.

As shown in FIG. 5 and FIG. 6, one of the release manners of the conduit 4 in the present disclosure is that the gear ring 14 can be deformed towards a direction away from the propeller 16 by pushing the propeller 16 to the direction of the gear ring 14, so that the conduit 4 is loosened and taken out. It is worth mentioning that the main body 11 to which the release structure in the present disclosure can be adapted is not limited by internal components of the above-mentioned main body 11, and can be adapted to any main body 11 having a propeller 16 and a gear ring 14, so no matter there is a seal component 12 (one or more seal components 12 can be provided, and a plurality of seal components 12 can be stacked and separated from one another), a seal ring support component or a conduit support component or not in the prior art does not affect the implementation of the present disclosure.

In some embodiments, as shown in FIG. 3 and FIG. 4, the push type conduit joint release structure includes a sleeve 2 and a releaser 3. Wherein, the sleeve 2 may be made of metal, plastic or other materials with certain hardness without limitation. The sleeve 2 includes an upper sleeve 21, a lower sleeve 22 and a connector 23 for connecting the upper sleeve 21 and the lower sleeve 22. The upper sleeve 21, the lower sleeve 22 and the connector 23 are integrally formed, preferably. The upper sleeve 21 in the present disclosure is annular, and the lower sleeve 22 is preferably annular (as shown in FIG. 3). A region between the upper sleeve 21 and the lower sleeve 22 is partitioned by the connector 23 to form at least one second notch 24. Preferably, two groups of connectors 23 are provided, and the two groups of connectors 23 are symmetrically provided. An inner wall of the connector 23 is preferably in the shape of a cambered surface. A region between the upper sleeve 21 and the lower sleeve 22 is partitioned by the connectors 23 to form two symmetrical second notches 24. A front end of the releaser 3 is inserted into the second notches 24.

As shown in FIG. 3 and FIG. 5, the sleeve 2 needs to sleeve the outer peripheral wall 1101 of the main body 11 in advance. At that time, the upper sleeve 21 and the lower sleeve 22 are located outside an end of the main body 11 and outside the outer peripheral wall 1101 of the main body 11, respectively. It is worth mentioning that the push type conduit joint release structure in the present disclosure requires that the outer peripheral wall 1101, at any end, of the main body 11 of the conduit joint 1 protrudes to form a step 111. The upper sleeve 21 and the lower sleeve 22 are respectively located on both sides of the protruding step 111, so that the lower sleeve 22 is limited by the step 111 and does not fall off from the conduit joint 1.

Figure 7:
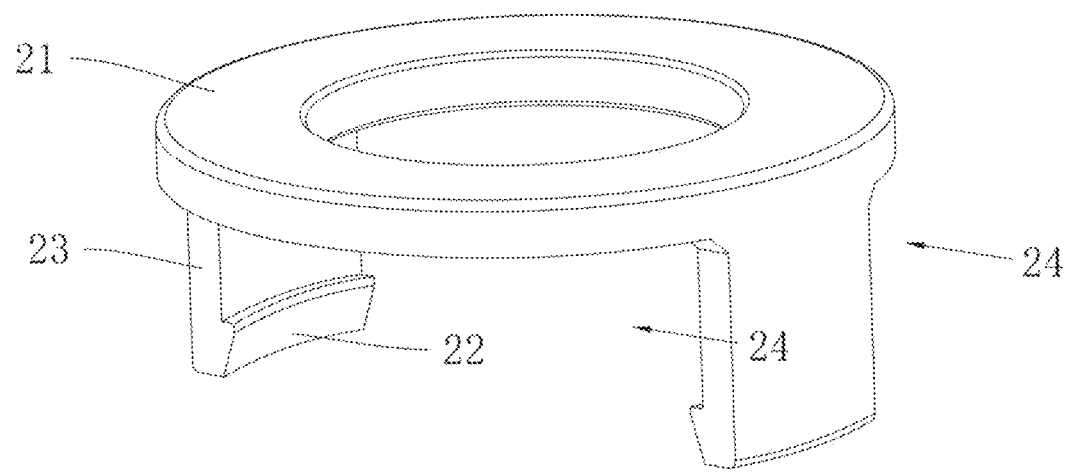
FIG. 7 is a structure diagram of a sleeve in one preferred embodiment of the present disclosure.

In order to achieve the pre-assembly effect of the above-mentioned sleeve 2, in some embodiments, the structure of the lower sleeve 22 may also be a snap tooth structure (as shown in FIG. 7), and there are at least two snap teeth. The snap tooth structure can also be limited by the step 111 at the step 111 so as to avoid the problem that the sleeve 2 falls off from the conduit joint 1.

In addition, as shown in FIG. 3 and FIG. 5, the inner diameter of the upper sleeve 21 may be equal to the inner diameter of the propeller 16. In a preferred embodiment, the inner diameter of the upper sleeve 21 is preferably between the inner diameter of the propeller 16 and the outer diameter of the propeller 16. The sleeve 2 can abut against an end wall of the propeller 16 after being pressed down, thereby extruding the propeller 16, realizing the deformation of the gear ring 14 and the release of the conduit 4. It is worth mentioning that the extrusion manner is a manual extrusion release mode, which is just one of the ways to release the conduit 4, and the other way can be realized by inserting the releaser 3.

In some embodiments, as shown in FIG. 3 and FIG. 5, the releaser 3 includes an open release part 31 (located at a front end) and a handle part 32 located behind the release part 31. Wherein, the release part 31 includes two legs 311 and a waist 312 for connecting the two legs 311. The two legs 311 and the waist 312 are integrally formed, preferably. One end, away from the waist 312, of each of the two legs 311 is provided with a guide part 3111. The thickness of the guide part 3111 is gradually increased from one end away from the waist 312 to the other end. It is worth mentioning that in some embodiments, the thickness of the leg 311 can also change, so that the leg 311 and the guide part 3111 form a gradual transition form. At this time, the leg 311 and the guide 3111 are free of obvious limit.

As shown in FIG. 3 and FIG. 5, when it is necessary to release the conduit 4 clamped in the conduit joint 1, it is only necessary to insert the releaser 3 into a gap between the upper sleeve 21 and the propeller 16 (the gap is formed by the second notch 24). It is worth mentioning that the gap (formed by the second notch 24) should be smaller than the thickness of the leg 311 (in a state that the propeller 16 is not extruded by the releaser 3) in order to achieve extrusion for the propeller 16 when the releaser 3 is inserted, thereby allowing the gear ring 14 to loosen the conduit 4 and taking the conduit 4 from the conduit joint 1 easily.

Finally, as shown in FIG. 3 and FIG. 5, the sleeve 2 provided by the present disclosure can not only move in the axial direction on the conduit joint 1, but also rotate on the conduit joint 1 in a state that the connector 23 is long, so that the second notch 24 rotates to the angle and height that facilitates the insertion of the releaser 3 so as to overcome the problem of difficulty in operation when the conduit joint 1 is installed at a corner of a wall or blocked by articles.

The working process and beneficial effects of the present disclosure are as follows. The first notch 1411 is reduced after the gear ring 14 is extruded, so that the gear ring 14 can be put into the main body 11, is externally expanded at the limit ring groove 112, and is stuck in the main body 11, thereby replacing the scheme of supporting the gear ring 14 by additional seal ring support components and conduit support components on both sides in the prior art, reducing the quantity of fittings and promoting the structural stability.

After the conduit joint 1 has been assembled, the sleeve 2 may sleeve an outer circumferential wall 1101 of the main body 11. At this time, the upper sleeve 21 and the lower sleeve 22 are located on both sides of the protruding step 111, respectively. At the same time, the upper sleeve 21 and the lower sleeve 22 are located outside the end of the main body 11 and the outer circumferential wall 1101 of the main body 11, respectively.

When the conduit 4 is inserted into connection fittings, the conduit 4 can be automatically clamped by the gear ring 14. When it is necessary to release the conduit 4 clamped in the conduit joint 1, the conduit 4 can be released directly by manually pressing the sleeve 2, or the releaser 3 can be inserted between the upper sleeve 21 and the propeller 16 at an end of the conduit joint 1 (namely, the gap formed by the second notch 24), so that the propeller 16 extrudes the gear ring 14 inside the conduit joint 1. Therefore, the conduit 4 is loosened by the teeth 143 of the gear ring 14, and then the conduit 4 is easily taken out from the conduit joint 1.

The foregoing descriptions are merely exemplary embodiments of the present disclosure, but are not intended to limit the present disclosure. Any modification, equivalent replacement, or improvement made within the design concept of the present disclosure shall fall within the protection scope of the present disclosure.

What is claimed is:

1. A push conduit joint release structure, comprising a tubular main body (11), the main body (11) being internally provided with a gear ring (14) and a propeller (16), wherein
   the gear ring (14) comprises an outer ring (141) with a first notch (1411), and a plurality of teeth (143) slantly protruding towards an axial direction (5) of the outer ring (141) on an inner wall (1410) of the outer ring (141); and wherein
   an inner circumferential wall (110) of the main body (11) is concave at a position of the gear ring (14) to form a limit ring groove (112), and wherein when the gear ring (14) is located inside the limit ring groove (112), the plurality of teeth (143) protrude out of an inner circumferential wall (1601) of the propeller (16);
   wherein a multilayered structure of the plurality of teeth (143) is formed along the axial direction of the outer ring (141), and wherein avoidance holes (162) for the plurality of teeth (143) to pass through are formed in a circumferential side wall (160) of the propeller (16).

2. The push conduit joint release structure according to claim 1, wherein the outer ring (141) and each of the plurality of teeth (143) are connected through connecting parts (142), respectively.

3. The push conduit joint release structure according to claim 2, wherein the outer ring (141), the connecting parts (142) and the plurality of teeth (143) are integrally formed.

4. The push conduit joint release structure according to claim 2, wherein a joint of the connecting part (142) and each tooth (143) of the plurality of teeth is an arc transition or angle transition.

5. The push conduit joint release structure according to claim 1, further comprising a sleeve (2) and a releaser (3), wherein
   the sleeve (2) comprises an upper sleeve (21), a lower sleeve (22) and a connector (23) for connecting the upper sleeve (21) and the lower sleeve (22), a region between the upper sleeve (21) and the lower sleeve (22) being partitioned by the connector (23) to form at least one second notch (24); and wherein
   the releaser (3) comprises an open release part (31) and a handle part (32) located behind the release part (31).

6. The push conduit joint release structure according to claim 5, wherein two connectors (23) are provided, the two connectors (23) are symmetrically provided, and a region between the upper sleeve (21) and the lower sleeve (22) being partitioned by the two connectors (23) to form two symmetrical second notches (24).

7. The push conduit joint release structure according to claim 5, wherein the release part (31) comprises two legs (311) and a waist (312) for connecting the two legs (311), one end, away from the waist (312), of each of the two legs (311) being provided with a guide part (3111), and a thickness of the guide part (3111) being gradually increased from the one end away from the waist (312) to the other end.

8. The push conduit joint release structure according to claim 7, wherein the two legs (311) and the waist (312) are integrally formed.

9. The push conduit joint release structure according to claim 8, wherein the upper sleeve (21), the lower sleeve (22) and the connectors (23) are integrally formed.

10. A push conduit joint release structure, comprising a tubular main body (11), the main body (11) being internally provided with a gear ring (14) and a propeller (16), wherein
    the gear ring (14) comprises an outer ring (141) with a first notch (1411), and a plurality of teeth (143) slantly protruding towards an axial direction (5) of the outer ring (141) on an inner wall (1410) of the outer ring (141); and wherein
    an inner circumferential wall (110) of the main body (11) is concave at a position of the gear ring (14) to form a limit ring groove (112), and wherein when the gear ring (14) is located inside the limit ring groove (112), the plurality of teeth (143) protrude out of an inner circumferential wall (1601) of the propeller (16);
    wherein the push conduit joint release structure further comprises a sleeve (2) and a releaser (3), wherein
    the sleeve (2) comprises an upper sleeve (21), a lower sleeve (22) and a connector (23) for connecting the upper sleeve (21) and the lower sleeve (22), a region between the upper sleeve (21) and the lower sleeve (22) being partitioned by the connector (23) to form at least one second notch (24); and wherein
    the releaser (3) comprises an open release part (31) and a handle part (32) located behind the release part (31).

* * * * *